April 6, 1926.
C. H. BESSE
1,579,854
DERRICK
Filed May 11, 1925          2 Sheets-Sheet 1
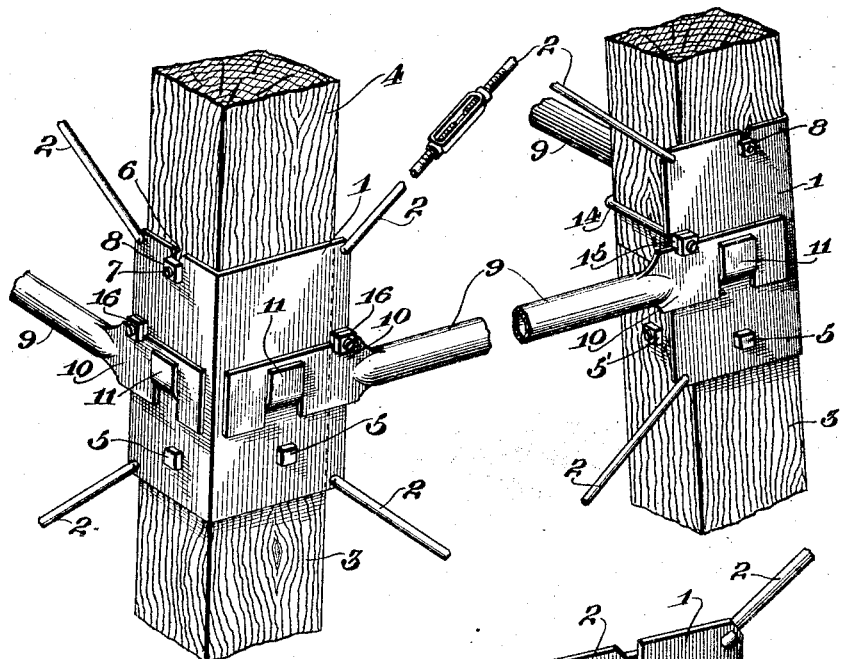
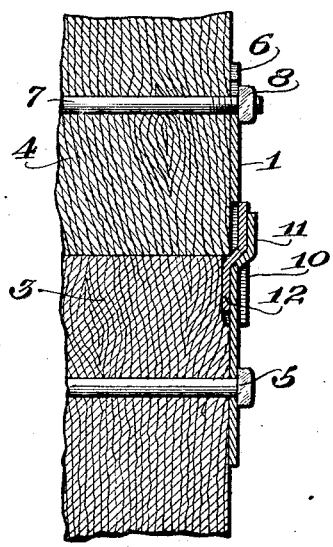
Inventor
C. H. Besse.
By William C. Linton.
Attorney April 6, 1926.
C. H. BESSE
DERRICK
Filed May 11, 1925
1,579,854
2 Sheets-Sheet 2
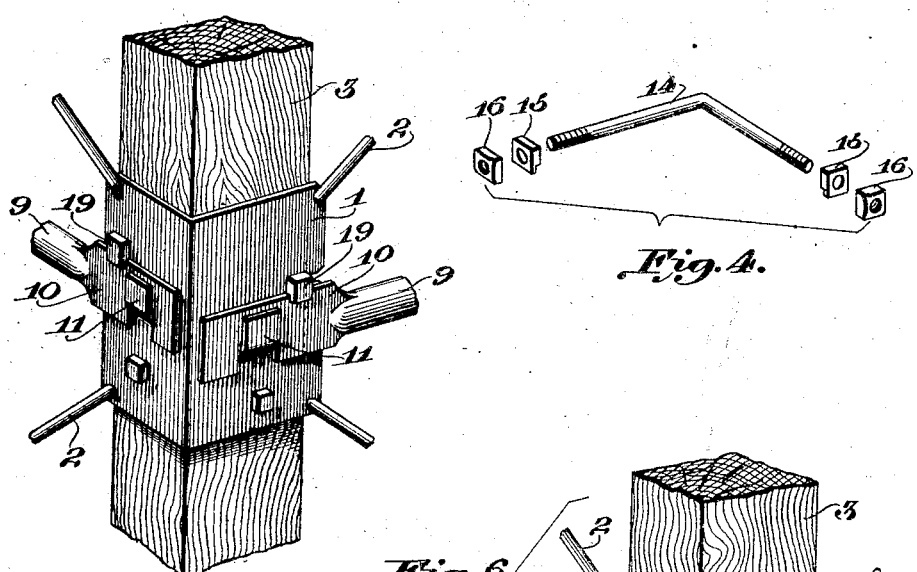
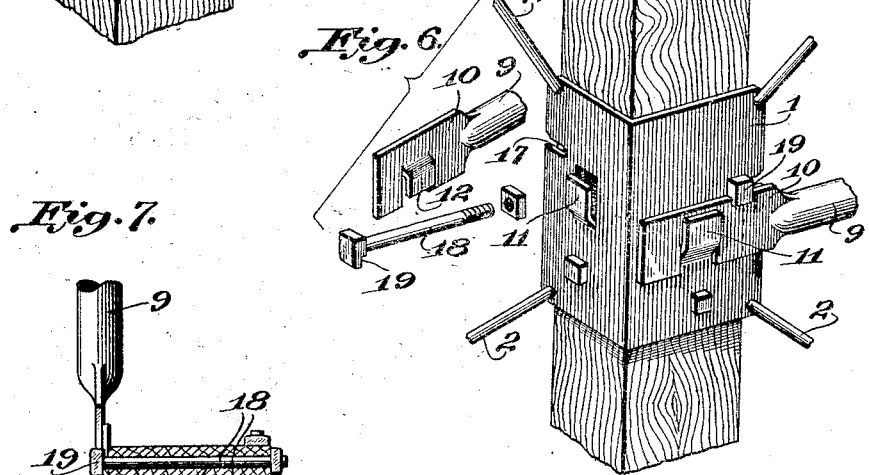
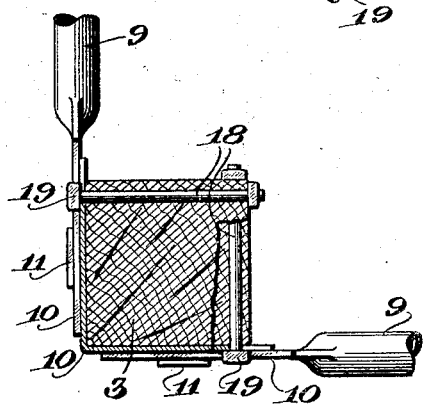
Inventor
C. H. Besse.
By William C. Lintow
Attorney Patented Apr. 6, 1926.

1,579,854

UNITED STATES PATENT OFFICE.

CARL H. BESSE, OF TULSA, OKLAHOMA, ASSIGNOR OF ONE-THIRD TO FRANK M. MAHAN AND ONE-THIRD TO EARNEST McCARTY.

DERRICK.

Application filed May 11, 1925. Serial No. 29,531.

*To all whom it may concern:*

Be it known that I, CARL H. BESSE, a citizen of the United States of America, residing at Tulsa, in the county of Tulsa and State of Oklahoma, have invented certain new and useful Improvements in Derricks; and I do hereby declare that the following is a full, clear, concise, and exact description of the invention, such as will enable others skilled in the art to which it appertains to make and use the same.

This invention relates to improvements in derricks or towers such as are generally used in connection with that rigging utilized in the drilling, spudding, et cetera, of oil, gas, or artesian wells and particularly, to such constructions as these wherein the supporting legs comprise longitudinally aligned sections, the invention having for an object to provide a novel and highly efficient form of bracket or coupling plate and leg braces or girths as generally disclosed in the pending applications for Letters Patent of Arlen L. Bowers, serial numbered 649,744 and 649,746, which may be connected to the abutting or meeting ends of the leg sections with but a minimum number of bolts or like fasteners and will positively and rigidly join said sections in aligned relationship, hence, lending materially to the practicability and stability of the derrick or tower construction.

It is likewise an object of the invention to provide a coupling plate of the character mentioned having means for permitting of quick and firm connection or interlocking of girth ends thereto, said plate and girth ends being equipped with interengageable means which when in assembled or connected position, will absolutely prevent any form of relative horizontal or vertical movement, said connection being of such simple and positive nature as to be readily effected without use of bolts or kindred fastening devices and being such as to allow of the operation in a minimum period of time and if required, by unskilled labor.

Another and equally important object of the invention is to provide the coupling with a combined fastening or securing and locking means whereby the lower end of an upper leg section will be positively connected to the upper end of a lower leg section and held against any vertical movement with respect thereto and additionally, will afford an effectual lock for an adjacent girth end interconnected with the coupling, preventing its vertical movement or displacement with respect to the coupling and thus enhancing the efficiency of the device.

Other objects of the invention will be in part obvious, and in part pointed out hereinafter.

In order that the invention and its mode of operation may be readily understood by persons skilled in the art, I have in the accompanying illustrative drawing, and in the detailed following description based thereupon, set out several embodiments of the same.

In these drawings:—

Figure 1 is a perspective view of my improved coupling as applied to the meeting or adjacent ends of derrick leg sections, portions of the figure being broken away;

Figure 2 is an enlarged detail in perspective of the improved coupling having portions broken away;

Figure 3 is an enlarged fragmentary detail in vertical section through the coupling plate and the connected derrick leg sections showing the interlocking connection as between the coupling plate proper and the adjacent end of a girth;

Figure 4 is a disassembled detail in perspective of a form of bolt employed in connection with the coupling;

Figure 5 is a perspective view of a slightly modified form of my improved coupling wherein a different species of fastening means is employed for connecting the lower end of the upper leg section to the coupling plate;

Figure 6 is a disassembled perspective view of this modified form of coupling; and, Figure 7 is a horizontal section through the same.

Having more especial reference to the drawings in connection with which like characters of reference will designate corresponding parts and particularly, having to do with that form of the invention disclosed in the Figures 1 to 4 inclusive, the invention may be stated to comprise a substantially right angularly formed coupling plate indicated in its entirety by the numeral 1, said plate being formed of metal of suitable gauge and strength, or of other material, such as conditions or preference may dictate; openings being formed in the outwardly disposed corner portions thereof and adapted to have the adjacent ends of turnbuckle braces generally designated by the numeral 2 connected thereto, as is clearly shown in the Figures 1 and 2.

This angle coupling plate 1 is adapted to have the lower portion of the same received and snugly embrace the upper end of a lower derrick leg section 3, while the upper portion of such plate is adapted to similarly engage and receive a lower end of an upper derrick leg section 4, the meeting or adjacent ends of these several derrick leg sections 3 and 4 abutting as is clearly shown in the drawing. To effect connection between the plate 1 and the derrick leg section 3, elongated bolts 5 are passed through suitable openings formed in the lower portion of said plate 1 and through adjacent openings formed in the leg section 3 and arranged at relative right angles, one slightly above the other. The opposite and extended ends or shank portions of these bolts 5 are then adapted to have locking nuts or similar devices 5' turned into engagement therewith whereby to effect a fixed or immovable connection of the angle coupling plate 1 to said derrick leg section 3. At this point, it is timely to note that the angularly disposed portions of the coupling plate 1 are of widths slightly greater than the adjacent portions of the leg sections 3 and 4, and hence, portions of said plate will extend beyond these sections in the manner indicated in the Figure 1, thus permitting of ready access and connection of the turnbuckle braces 2 to the outwardly disposed corner portions of the plate.

One side of the coupling plate 1 is formed with a vertically disposed upper marginally opening slot or way 6 which, in turn, is adapted to vertically and slidably receive therein the extended portion of an elongated bolt 7 passed through the lower end of the upper derrick leg section 4 and provided with a locking nut 8. In this way, it will be understood that a removable connection will be afforded as between the lower end of the upper derrick leg section 4 and said plate 1, facilitating, by reason of the vertical slidable introduction of the extended portion of said bolt 7 into the slot 6, proper alignment and positioning of such upper leg section 4 with the lower leg section 3. Subsequently to engagement of the bolt 7 in the marginally opening slot or way 6, it will be understood that the nut 8 is tightened, thus setting up a positive connection of the same with the adjacent face or side of the plate 1.

Girths 9 are provided the coupling, comprising bars or rods of suitable length, each of which has its opposite ends flattened as indicated in the drawings by the numeral 10. In order that these flattened and oppositely disposed ends 10 of the girths 9 may be effectually connected to their respective coupling plates 1, the right angularly opposed portions or sides of the plate have upwardly extending vertically disposed fingers 11 struck outwardly therefrom as is clearly shown in the Figures 1 and 3, while a downwardly extending inwardly spaced finger 12 is formed upon the lower portion of each of the flattened ends 10 of the girths 9, such fingers 12 being of a size and shape complemental to the fingers 11 and being arranged upon their respective flattened end portions 10 to be disposed coincidental with said finger 11 upon the coupling plate 1. Through this provision of fingers 11 and 12 upon the sides of the coupling plate 1 and the flattened ends of the girths 9, it will be understood that a vertically effectible interlocking connection will be permitted as between said plate 1 and the flattened girth ends 10, as for illustration, in the Figures 1 and 2; the inwardly spaced finger 12 passing through the opening formed in the plate 1 by the striking of the finger 11 outwardly therefrom, downwardly into interlocking and overlapping engagement with the adjacent inner side or face of the plate 1 until that relative arrangement of parts as is clearly indicated in the Figure 3 is attained. In this connection, it will be noted upon reference to the Figure 3 that it has been found practical to cut away a portion of the adjacent side of the upper end of the lower derrick leg section 3 to permit of the aforesaid overlapping and interlocking connection of the finger 12 with the coupling plate 1.

With the flattened end 10 of a derrick girth 9 interlockingly connected to one side of the coupling plate 1 as heretofore described, it will be understood that relative horizontal movement of such derrick with respect to the coupling plate 1 will be positively prevented. To ensure against vertical movement of the girths 9 with respect to the plate 1, horizontally positioned marginally opening slots or ways 13 are formed in the intermediate and outer side portions of the angle plate 1 and are adapted to receive therein the shank or screw threaded portions of an angle tie-bolt 14, whereupon notched washers or similar devices 15 are engaged over the extended ends and are bindingly secured upon adjacent portions of the upper sides of the flattened end 10 of the derrick girths through the medium of locking and adjusting nuts 16. It will be noted that the angle bolt 14 embraces the inner or rearward portion of the lower end of the upper derrick leg section 4 and in so doing, provides a highly efficient and practical form of tie as between the lower end of this upper derrick leg section 4 and the coupling plate 1, serving to afford additional means for preventing any vertical movement whatsoever of said section 4 with respect to the lower section 3 of the plate 1. Likewise, due to the fact that the notched washer 15 is engaged over an adjacent portion of the upper side of the flattened end 10 of a derrick girth 9, it will be understood that that particular end portion of such girth will be positively prevented from having any semblance of vertical movement or shifting with respect to the plate 1 with which it is interlocked and thereby, displacement or interference with the efficiency of the interlocking connection as between the coupling plate 1 and the girth 9 brought about through the medium of the outwardly and inwardly spaced fingers 11 and 12 will be positively prevented. Thus, the utility of the bolt 14 is twofold.

Having reference to the modified form of the invention as disclosed in the Figures 5, 6 and 7, it is to be understood that the construction of the coupling plate 1 corresponds with that as disclosed in the first described embodiment and by consequence, this description will suffice. However, instead of employing an angle bolt 14 whereby to provide means for removably connecting the lower end of the upper derrick leg section 3 to said plate 1, marginally opening slots or ways 17 are formed in the intermediate outer side portions of the coupling plate 1 as is clearly shown in the Figures 5 and 6 and these slots or ways are adapted to laterally and slidably receive therein the extended adjacent end portions of bolts 18 passed through the lower end of the upper derrick leg section 3 at relative right angles. The extended ends or head portions of each of these bolts 18 are somewhat enlarged and notched upon their lower inner face portions as indicated at 19, whereby a portion of each of these heads will be permitted to overlappingly engage with an adjacent portion of the upper side of each of the interlocked or interconnected flattened girth ends 10, as is shown in the Figure 5. Inasmuch as this particular arrangement of bolts 18 establishes a positive connection as between the lower end of the upper derrick leg section 3 and the angularly opposed sides of the coupling plate 1, it of course will be understood that the provision of vertically disposed marginally opening slots, such as indicated hereinbefore by the numeral 6 are preferably eliminated. However, if desired, these slots may, of course, be provided in connection with this particular form of the invention, such as conditions or preference may dictate.

Not only will the bolts 18 provide a positive removable connection as between the lower end of the upper derrick leg section 1 and the upwardly extended portion of the coupling plate 1, but also, by reason of the overlapping engagement of the notched head portions with respect to the flattened girth ends 10, it will be understood that said girth ends will be positively prevented from having any vertical movement whatsoever with respect to the adjacent side of the coupling plate when once engaged, thereby preventing interference with the operativeness or efficiency of the interlocking connection as established through the medium of the interlockingly engaged fingers 11 and 12 hereinbefore described.

Manifestly, the construction shown is capable of considerable modification, and such modification as is within the scope of my claims, I consider within the spirit of my invention.

I claim:—

1. A coupling comprising a plate having an upwardly disposed outwardly spaced finger thereon, a girth having an inwardly spaced downwardly disposed finger thereon adapted to interlockingly engage said first finger, and means on the plate engageable with a portion of the girth for preventing vertical movement of the same.

2. A coupling comprising a plate having an upwardly disposed outwardly spaced finger thereon, a girth having an inwardly spaced downwardly disposed finger thereon adapted to interlockingly engage said first finger, and connecting means extending through said plate having one end thereof engageable with a portion of the girth for preventing its vertical movement.

3. A coupling comprising a plate having an upwardly disposed outwardly spaced finger thereon, a girth having a flattened end, said flattened end being formed with an inwardly spaced downwardly disposed finger adapted to interlockingly engage said first finger, and means passing through the plate engageable with a portion of the flattened end of the girth for preventing vertical movement of the same.

4. A coupling comprising a plate having an upwardly disposed outwardly spaced finger struck therefrom, a girth having an inwardly spaced downwardly disposed finger struck therefrom adapted to interlockingly engage said first finger and to overlap an adjacent portion of said plate, and means on the plate engageable with a portion of the girth for preventing its vertical movement.

5. A coupling comprising a plate having an upwardly disposed outwardly spaced finger struck therefrom, a girth having a flattened end and an inwardly spaced downwardly disposed finger struck from such flattened end adapted to interlockingly engage over said first finger and overlappingly engage a portion of said plate, and means extending from the plate engageable with a portion of the flattened girth end for preventing vertical movement of the same.

6. A coupling comprising a plate having an upwardly disposed outwardly spaced finger struck therefrom, a girth having a flattened end, an inwardly spaced downwardly disposed finger struck from said flattened end adapted to interlockingly engage over said first finger and to overlappingly engage an adjacent portion of the plate, said plate having a marginally opening slot formed in a portion thereof in proximity to the finger struck therefrom, and connecting means having a portion of the same received in and extending from said slot adapted to engage with a portion of said girth whereby to prevent vertical movement of the same.

7. A coupling comprising an angle plate having upwardly disposed outwardly spaced fingers struck from the angularly opposed sides thereof, girths each having flattened ends, inwardly spaced downwardly disposed fingers struck from the lower portions of each of said flattened ends adapted to interlockingly engage over certain of said first fingers, the angularly opposed sides of said plate having marginally opening horizontal slots formed therein directly above the fingers struck therefrom, and an angle bolt having its opposite extremities received in said slots and extended from the sides of the plate whereby to abuttingly engage with adjacent portions of said flattened girth ends to prevent vertical movement of the same.

8. A coupling comprising an angle plate having upwardly disposed outwardly spaced fingers struck therefrom, girths having flattened ends, inwardly spaced downwardly disposed fingers struck from the lower portions of each of said flattened ends adapted to interlockingly engage certain of said first fingers and to overlappingly engage adjacent portions of the sides of said plate, the upper portion of one side of said plate having a vertically disposed marginally opening slot formed therein, connecting means having one end receivable in said slot, the opposite sides of said plate having marginally opening horizontally disposed slots formed therein in proximity to the fingers struck therefrom, and connecting means received through said horizontally disposed slots adapted to have abutting engagement with adjacent portions of said flattened girth ends whereby to prevent vertical movement of the same.

9. A coupling comprising a plate connected to one end of a leg section having a portion extended therebeyond, the extended portion of the plate overlying the adjacent portion of the lower end of an upper leg section, a girth, means on the plate and girth for permitting a vertically effectible interlocking connection therebetween, and connecting means adjacent said lower end of the upper leg section and through said plate having one end extended beyond the adjacent face of the plate and abutting the adjacent upper side of said girth whereby to maintain the interlocking connection.

10. A coupling comprising a plate connected to one end of a leg section having a portion extended therebeyond, the extended portion of the plate overlying the adjacent portion of the lower end of an upper leg section, a girth, means on the plate and girth for permitting a vertically effectible interlocking connection therebetween, one side of said plate having a marginally opening slot formed therein, and connecting means passing through the lower end of the upper leg section and through said slot extended from the adjacent face of said plate adapted to have abutting engagement with the adjacent upper side of the girth whereby to maintain the interlocking connection.

11. A coupling comprising an angle plate connected to one end of a leg section having a portion extended therebeyond, the extended portion of the angle plate overlying the adjacent portion of the lower end of an upper leg section, girths, each of said girths having flattened ends, means on the plate and the flattened ends of the girths for permitting a vertically effectible interlocking connection therebetween, and connecting means embracingly engaging the said lower end of the upper leg section and extending beyond the side portions of said angle plate having abutting engagement with the adjacent upper sides of said flattened girth ends whereby to maintain the interlocking connection.

12. A coupling comprising an angle plate connected to one end of a leg section having a portion extended therebeyond, the extended portion of the angle plate overlying the adjacent portion of the lower end of an upper leg section, girths, each of said girths having flattened ends, means on the flattened ends of the girths and the plate for permitting a vertically effectible interlocking connection therebetween, the angularly opposed sides of said plate having horizontally disposed marginally opening slots formed therein, and connecting means engaging the lower end of the upper leg section and passing through said horizontal slots, portions thereof being extended beyond the sides of said plate and having abutting engagement with the adjacent upper sides of said flattened girth whereby to maintain the interlocking connection ends.

13. A coupling comprising an angle plate connected to one end of a leg section having a portion extended therebeyond, the extended portion of the angle plate overlying the adjacent portion of the lower end of an upper leg section, girths, each of said girths having flattened ends, means on the flattened ends and on the angularly opposed sides of said plate for permitting a vertically effectible interlocking connection therebetween, one side of said plate having a marginally opening vertically disposed slot formed in its upper end, connecting means passing through the lower end of the upper leg section receivable in said slot, the angularly opposed sides of said plate having marginally opening horizontal slots formed therein, and connecting means engaging said lower end of the upper leg section and received in said horizontal slot adapted to have portions of the same abuttingly engaged with the adjacent upper sides of said flattened girth ends.

14. A coupling comprising an angle plate connected to one end of a leg section having a portion extended therebeyond, the extended portion of the same overlying the adjacent portion of the lower end of an upper leg section, girths, each of said girths having flattened ends, outwardly spaced upwardly disposed fingers struck outwardly from the several sides of said plate, inwardly spaced downwardly disposed fingers struck from the flattened ends of said girths adapted to interlockingly engage over certain of said first fingers and to overlappingly engage the adjacent portion of the sides of said angle plate, and means on the sides of said angle plate engageable with the adjacent upper sides of said flattened girth ends for preventing vertical movement of the same.

15. A coupling comprising an angle plate connected to one end of a leg having a portion extended therebeyond, the extended portion of the plate overlying the adjacent portion of the lower end of an upper leg section, upwardly disposed outwardly spaced fingers struck from the intermediate portions of each of the angularly opposed sides of said plate, girths, each of said girths having flattened ends, inwardly spaced downwardly disposed fingers struck from the lower portions of each of said flattened girth ends adapted to interlockingly engage over certain of said first fingers and to overlappingly engage with adjacent portions of said angle plate sides, one side of said angle plate having a marginally opening vertically disposed slot formed in its upper end, connecting means passing through the lower end of the upper leg section receivable in said vertical slot, the opposite extremities of said sides of the angle plate having marginally opening horizontally disposed slots formed therein, an angle bolt engaging the lower end of the upper leg section and having its extremities received in said horizontal slots, and means engaging the extremities of said angle bolt and abuttingly engaging the adjacent upper sides of said flattened girth ends whereby to prevent vertical movement of the same.

16. A coupling comprising a plate, a girth, means on the plate and the girth for permitting a vertically effectible interlocking connection therebetween, and connecting means passing through a portion of the plate and engageable with a portion of said girth whereby to prevent vertical movement of the same.

17. A coupling comprising a plate having an upwardly opening outwardly spaced pocket formed thereon, a girth having an inwardly spaced downwardly disposed finger upon the same adapted to interlockingly engage in said pocket, and means on the plate engaging with a portion of the girth for preventing vertical movement subsequent to engagement of the finger in said pocket.

18. A coupling comprising a plate having an upwardly opening outwardly spaced pocket formed thereon, intermediately of its opposite ends, a girth having an inwardly spaced downwardly disposed finger thereon adapted to interlockingly engage in said pocket, and means removably engageable with such plates and a portion of said girth whereby to prevent vertical movement of these girths subsequently to engagement of its finger in said pocket.

19. A coupling comprising an angle plate having upwardly opening, outwardly spaced pockets formed upon the sides thereof intermediately of their opposite ends, girths having each an inwardly spaced downwardly disposed finger thereon adapted to interlockingly engage in said pockets, the opposite sides of said plate having substantially horizontally arranged marginally opening slots formed therein, and means receivable in said slots adapted to have portions thereof extended beyond the outer faces of the adjacent sides of said plate, whereby to abuttingly engage adjacent portions of the girths to retain the fingers thereon in engagement with their respective pockets.

In witness whereof I have hereunto set my hand.

CARL H. BESSE.